United States Patent [19]

Zenker

[11] 4,023,418
[45] May 17, 1977

[54] CHANGE GEAR TRANSMISSION IN GROUP CONSTRUCTION, ESPECIALLY FOR LAND VEHICLES AND VEHICLES FOR THE BUILDING INDUSTRY

[75] Inventor: Walter Zenker, Bensberg-Refrath, Germany

[73] Assignee: Klockner-Humboltd-Deutz Aktiengesellschaft, Cologne, Germany

[22] Filed: Feb. 3, 1975

[21] Appl. No.: 546,769

[30] Foreign Application Priority Data

Feb. 2, 1974   Germany .......................... 2405023

[52] U.S. Cl. .................. 74/15.86; 74/331;
    74/360; 74/665 GA; 74/665 T; 74/745
[51] Int. Cl.² ................... F16H 37/00; F16H 3/08;
    F16H 37/06
[58] Field of Search ............ 74/15.63, 15.66, 331,
    74/359, 745, 360, 357, 15.86, 665 F, 665 G,
    665 GA, 665 H, 665 S, 665 T, 665 K

[56] References Cited

UNITED STATES PATENTS

| | | | |
|---|---|---|---|
| 1,417,950 | 5/1922 | Smalley | 74/745 X |
| 2,168,033 | 8/1939 | Johnston et al. | 74/15.63 X |
| 2,306,902 | 12/1942 | Rabe | 74/745 |
| 2,602,346 | 7/1952 | Eaton et al. | 74/745 X |
| 2,975,656 | 3/1961 | Haverlender | 74/745 |
| 3,374,681 | 3/1968 | Hugh et al. | 74/15.66 |
| R26,953 | 9/1970 | Warren et al. | 74/745 |

FOREIGN PATENTS OR APPLICATIONS

| | | | |
|---|---|---|---|
| 576,820 | 4/1946 | United Kingdom | 74/359 |
| 609,389 | 9/1948 | United Kingdom | 74/359 |

*Primary Examiner*—Samuel Scott
*Assistant Examiner*—Lance W. Chandler
*Attorney, Agent, or Firm*—Walter Becker

[57] ABSTRACT

A transmission for connecting a prime mover with a load, such as vehicle wheels, in which the transmission is of group construction with a primary group shiftable under load and at least one other group which is not shiftable under load. The group shiftable under load provides for at least two forward speeds and a reverse speed at the main output shaft of the transmission which supplies the power to the load.

13 Claims, 1 Drawing Figure

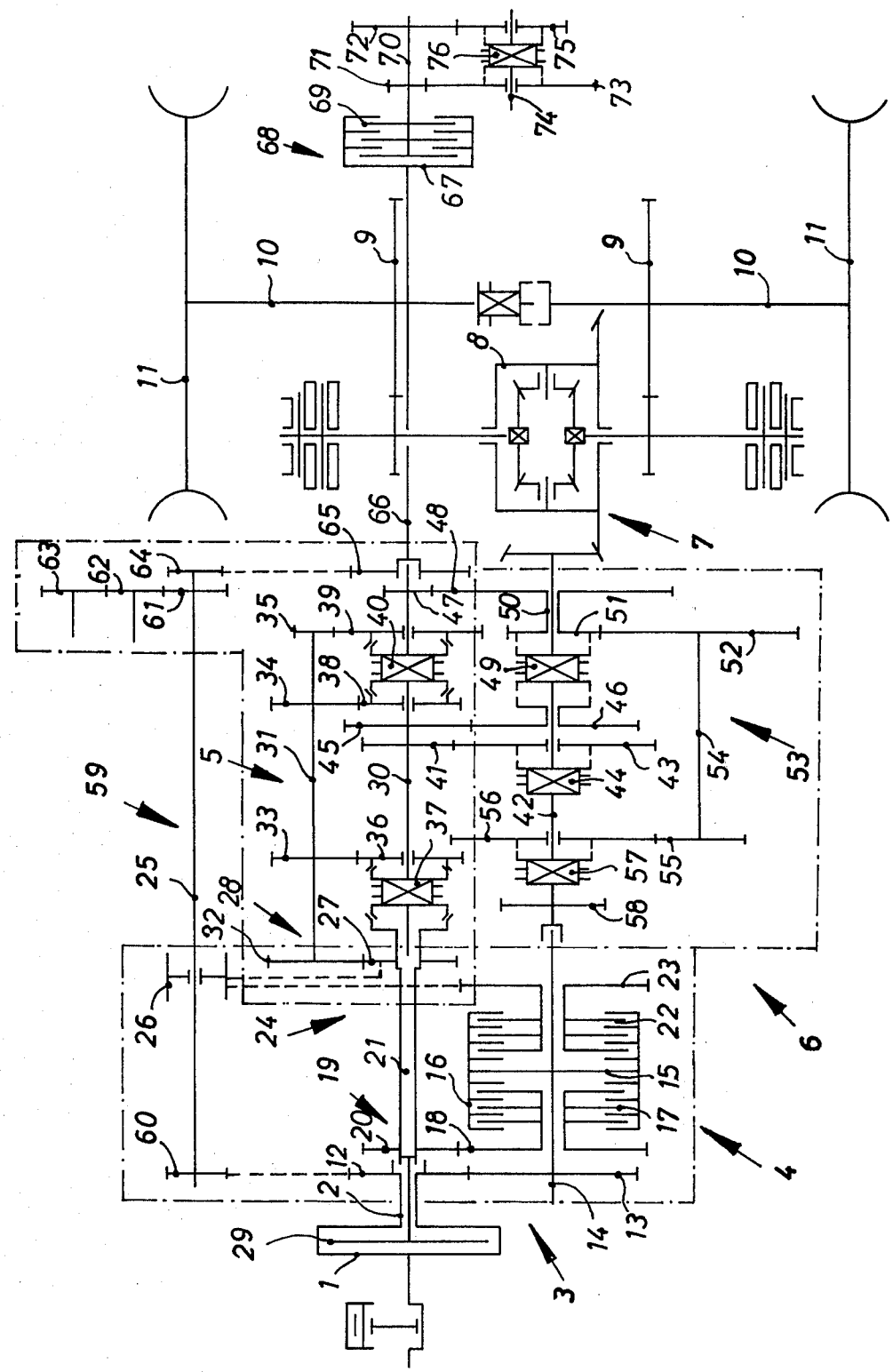

CHANGE GEAR TRANSMISSION IN GROUP CONSTRUCTION, ESPECIALLY FOR LAND VEHICLES AND VEHICLES FOR THE BUILDING INDUSTRY

The present invention relates to a change gear transmission in group construction, especially for land vehicles and vehicles for the building industry. More specifically, the invention concerns a change gear transmission with a group transmission providing a main control group, said group transmission being provided with one control stage for the rearward drive and two control stages for the forward drive, said stages being shiftable under load by means of two friction clutches adapted to be engaged and disengaged.

When working the soil and carrying out harvesting operations by means of agricultural motor vehicles with a change gear transmission of the above mentioned type, there exists the problem of working maximum surfaces with the load of the driving engine balanced at an optimum. This problem occurs in particular when working of long undulated agricultural areas and when working the soil of agricultural areas of which the soil density greatly varies. In addition thereto, in agriculture as well as in connection with construction work with loading operations using a loading device at the front and/or the rear, there exists the problem of realizing short loading times by a quick driving to and a slow driving into the material to be loaded and by quickly transporting the loaded material away.

In an effort to solve the above mentioned problems, a change gear transmission of the above mentioned general type has been suggested by German patent disclosure 1,181,558- Haverlender corresponding to U.S. Pat. No. 2,975,656- Haverlender issued Mar. 21, 1961 according to which the group transmission which is operable through the intervention of a driving clutch comprises a first friction clutch which connects the input shaft with the output shaft, and a second friction clutch which is coaxially arranged with regard to the output shaft. The second friction clutch of the group transmission is through the intervention of an engageable and disengageable driving clutch operable through a forward transmission or a reversing transmission which are engageable selectively. This heretofore known change gear transmission, however, has the drawback that with this transmission and with the forward drive engaged for the selective control of the stepped forward control stage under load, no change under load to rearward drive can be carried out by means of the two friction clutches. Furthermore, with the heretofore known change gear transmission, a change under load from one forward to the other forward stages is not possible when the reversing gear transmission is engaged and interposed in the flow of force between the driving clutch and the friction clutch.

Starting from the above finding, it is an object of the present invention to provide a change gear transmission of the above mentioned general type while avoiding the drawbacks referred to above of heretofore known change gear transmissions and while improving said heretofore known change gear transmissions so that when employing the driving clutch as third control clutch of the group transmission, a direct shifting under load from selective forward drive to selective rearward drive will be possible while simultaneously permitting the shifting under load from one forward control stage to another forward control stage without previously mechanically shifting any intermediate transmission gears.

These objects and other objects and advantages of the invention will appear more clearly from the following specification, in connection with the accompanying drawing, diagrammatically illustrating a change gear transmission according to the present invention.

The change gear transmission according to the present invention is characterized primarily in that the primary parts of the two friction clutches are permanently frictionally connected to the driving source of the group transmission, and that the output shaft of said group transmission in one of its control stages is adapted to be driven directly through the intervention of the driving source while bypassing the power flow of the two friction clutches through the intervention of a third friction clutch adapted to be engaged and disengaged. By means of such change gear transmission, it is possible when working the soil or in connection with harvesting operations advantageously to shift from the low or higher forward control stage under load to the other forward control stage, and in particular when carrying out reversing operations to shift under load to the reversing stage without previously preselecting a reversing transmission.

A particularly simple and economic construction of the gear change transmission is obtained in conformity with a further development of the invention. According to this further development of the invention, the output shaft of the group transmission and the friction clutch for the direct drive of said output shaft are arranged coaxially with regard to the output shaft at the driving source. Moreover, the driving source is permanently frictionally connected to a drive shaft of an intermediate transmission, the transmission shaft of which serves for journaling the first two friction clutches with one gear each associated with the secondary part. One of said last mentioned gears meshes with a gear fixedly connected to the output shaft, and the other one of said last mentioned gears meshes with a reversing gear which in its turn meshes with a gear fixedly connected to the output shaft of the group transmission. For purposes of double use structural elements, it is expedient in this connection that one of the two gears fixedly connected to the output shaft of the group transmission simultaneously forms the driving transmission of the main group following said driving transmission.

The overall construction of the group transmission is furthermore favorably affected by the fact that the friction clutches, the primary parts of which are continuously frictionally connected to the driving source are designed as disc clutches adapted to be engaged by a pressure medium, and is furthermore favorably affected by the fact that the friction clutch which is parallelly arranged in the flow of force is designed as commercially customary driving clutch adapted to be engaged by spring force.

If the change gear transmission is provided with an auxiliary drive operable in parallel to the flow of force of the group transmission by the driving force and if the auxiliary drive includes a friction clutch adapted to be engaged and disengaged, it is suggested according to a further development of the invention that the auxiliary drive includes a secondary shaft which is adapted to be driven by the transmission non-rotatably connected to the drive source, and which serves for directly or indirectly driving the friction clutch of the auxiliary drive. In this connection, a particularly economic solution is obtained when the secondary shaft of the auxiliary drive is arranged parallel to the output shaft of the group transmission and comprises a non-rotatable gear which meshes with a gear that is non-rotatably mounted on the drive shaft of the transmission which is continuously frictionally connected to the drive source. If the gear transmission comprises an output shaft of the main group which output shaft is coaxially arranged with regard to the output shaft of the group transmission, it is suggested for purposes of a simple mounting of the auxiliary drive that the auxiliary drive includes an auxiliary shaft which is coaxial with regard to the output shaft of the main control group and is driven by said secondary shaft, said auxiliary shaft being non-rotatably connected to the primary part of the friction clutch of the auxiliary drive.

For an economic design of the reversing stage in the group transmission while simultaneously taking advantage of a secondary shaft of the auxiliary drive as mount, it is provided according to the invention that the reversing gear of the group transmission is journaled on the secondary shaft of the auxiliary drive. In this way, a further double use of the secondary shaft of the auxiliary drive is realized due to the fact that the secondary shaft includes one or more gears for the drive of an auxiliary pump or other auxiliary units.

For purposes of obtaining an optimum solution for the group transmission and the main control group with regard to the control as well as with regard to the transmission of forces, it is suggested that the driving transmission of the countershaft of the main control group has gears with an identical number of teeth. For purposes of broadening the change gear transmission according to the invention to permit its employment in a particularly wide power range while realizing a very fine stepping of the velocity stages, it is additionally provided that the output shaft of the main control which is coaxially arranged to the output shaft of the group transmission and is adapted selectively to be coupled thereto, in connection with an output shaft coaxially arranged with regard to the countershaft of the group transmission forms a post-control group. In this way, a particularly favorable construction from a structural standpoint as well as from a conveying standpoint is formed with the realization of a plurality of control stages of the post-control group due to the fact that the output shaft of the main control group comprises two preferably adjacently arranged non-rotatable gears which mesh each with an associated gear which is freely rotatable on the output shaft of the postcontrol group and is selectively adapted to be coupled with said output shaft, one of said gears forming the fastest control stage of the post-control group.

In order to create an economic stage of the post-control group for a slow soil working operation and for the crawl speed operation, it is suggested according to the invention that the output shaft of the main control group in addition to the non-rotating gears for forming control stages of the post-control group, comprises a further non-rotatable gear. This last mentioned non-rotatable gear is preferably designed as a gear adjacent to the mounting of the output shaft and is arranged on said output shaft and furthermore meshes with a gear having a greater pitch diameter. This greater gear is freely rotatable on the output shaft of the post-control group and is selectively mounted so as to be adapted to be engaged therewith and is non-rotatably connected with a gear having a smaller pitch diameter. This smaller gear meshes with a crawl speed transmission which comprises a gear that meshes with another gear which is freely rotatable and is selectively adapted to be coupled to and arranged on the output shaft of the post-control group.

Referring now to the drawing in detail, the flywheel 1 of a non-illustrated driving source designed as internal combustion engine is permanently frictionally connected to a drive shaft 2 of a transmission 3 of the group transmission 4 pertaining to the change gear transmission of the invention. This change gear transmission in addition to the group transmission 4 comprises a main control group 5 following said group transmission 4 and also comprises an auxiliary control group 6 adapted to be driven by said main control group 5. Through the intervention of said post-control group 6 a bevel gear drive 7 is adapted to be driven. The bevel gear drive 7 is followed by the differential 8 by means of which through the intervention of a transmission 9 each a driving axle section 10 each with an associated driving gear 11 is adapted to be driven. The transmission 3 of the group drive in addition to having a gear 12 which is non-rotatably mounted on the drive shaft 2 also comprises a gear 13 meshing with said gear 12. This gear 13 is non-rotatably mounted on a countershaft 14 which, in its turn, is rotatably journaled. The transmission countershaft 14 is non-rotatably connected to the primary part 15 of a double friction clutch 16 which is preferably engageably by a pressure medium, said double friction clutch 16 being designed as disc clutch. The double friction clutch 16 has a left-hand secondary part 17 which is nonrotatably connected to an adjacent gear 18 of a further transmission 19. This transmission 19 comprises a gear 20 which meshes with the gear 18 and which is non-rotatably mounted on the output shaft 21 of the group transmission 4. The transmission 19 forms the lowermost control stage L of the group transmission 4 of the under load shiftable control stages. By means of the primary part 15 it is possible selectively to drive a gear 23 which is keyed to the right-hand secondary part 22 of the double friction clutch 16. The gear 23 pertains to a reversing transmission 24 with a reversing gear 26 which is freely rotatable on a secondary shaft 25. The reversing gear 26 meshes with a gear 27 of the input transmission 28 of the main control group 5. The gear 27 is non-rotatably arranged relative to the output shaft 21. The reversing transmission 24 in cooperation with the gear 27 forms the under load shiftable reversing control stage R of the group transmission 4. In a second under load shiftable fast forward stage S of the group transmission 4, the output shaft 21 of the latter is directly connected to the flywheel 1 of the internal combustion engine. This connection is effected through the intervention of a drive clutch 29 which is coaxially arranged with regard to the input shaft 2 and is designed as a customary friction clutch adapted to be engaged and disengaged.

The main control group 5 has an output shaft 30 which is coaxially arranged with regard to the output shaft 21 of the group transmission 4 and is journaled in a non-illustrated transmission housing. The main control group 5 furthermore comprises a countershaft 31 which is parallel to said output shaft 30 and the drive of which is effected through the intervention of the input transmission 28 through a gear 32 of the countershaft 31, said gear 32 being drivingly engaged to mesh with the gear 27 which is fixed on the output shaft 21. The gear 27 preferably has the same pitch diameter as the gear 32 or a greater diameter than the latter, but has the same axial spacing. Furthermore, gears 33, 34 and 35 are non-rotatably mounted on the countershaft 31. The gear 33 meshes with a gear 36 which is freely rotatable and selectively engageable and disengageable on the output shaft 30 and with the latter forms the velocity stage III of the main control group 5. For the control of the velocity stage 3 and for coupling the output shaft 21 to the output shaft 30 for engaging the velocity stage IV of the main control group 5, there is provided a double control sleeve 37 equipped with synchronizing elements, said double control sleeve 37 being located between the gears 27 and 38 and being non-rotatably but axially displaceable on the output shaft 30. For forming the velocity stage II of the main control group 5, the gear 34 meshes with a gear 38 which is freely rotatable and selectively engageable and disengageable on the output shaft 30. The velocity stage I of the main control group 5 is formed by the gear 35 and by a gear 39 meshing with gear 35. Gear 39 is freely rotatable and selectively engageable and disengageable on output shaft 30. For purposes of engaging the velocity stages I and II, a double control sleeve 40 with synchronizing elements is provided between the two gears 38 and 39. The double control sleeve 40 is operatively connected through a non-illustrated control rod similar to the double control sleeve 37 to a common control lever of the main control group 5. In addition to the above mentioned power conveying elements of the outut shaft 30, a gear 41 is provided between the gears 36 and 38. This gear 41 is non-rotatable on shaft 30 and has a smaller pitch diameter than the gear 36. Gear 41 meshes with a gear 43 which is freely rotatable and selectively engageable and disengageable on an output shaft 42 of the post-control group 6. The gear 41 forms with the gear 43 an intermediate control stage Z for the main soil working operations in agriculture. The engagement of the intermediate stage Z is effected by means of a control sleeve 44 which is nonrotatable but axially displaceable on output shaft 42. For the formation of a control stage S of the post-control group 6, which control stage S is intended for a fast street operation, there is provided a gear 45 which is located between the gear 41 and the gear 38 of the output shaft 30 and is non-rotatable on shaft 30, said gear 45 having a greater pitch diameter than the gear 41. The gear 45 meshes with a gear 46 which is freely rotatable and selectively engageable and disengageable on output shaft 42. Furthermore, the output shaft 30 is on its right-hand side provided with a gear 47 non-rotatable thereon which has a smaller pitch diameter than the other gears. Gear 47 meshes with a gear 48 which is freely rotatably mounted on the output shaft 42. The gear 47 together with the gear 48 forms a control stage L for a flow soil working operation. The engagement of the control stage L is effected by means of a double control sleeve 49 which is located between the gears 46 and 48 and is non-rotatable but axially displaceably arranged on the output shaft 42. In the control position Z of the double control sleeve 49, the gear 48 is coupled to the output shaft 42 by control sleeve 49. Gears 48 and 51 are connected by means of a hollow shaft section 50. For purposes of forming a crawl stage Z of the post-control group 6, there is in addition to the gear 51 provided a gear 52 meshing with gear 51 and pertaining to a crawl speed transmission 53. The crawl speed transmission 53 furthermore comprises a gear 52 which is non-rotatably mounted on the transmission shaft 54 of said crawl speed transmission 53. The transmission 53 furthermore comprises a gear 55 which is non-rotatably connected to said shaft 54 and which meshes with a gear 56 which is freely rotatable on the output shaft 42. For purposes of engaging the crawl speed stage K there is provided a control sleeve 57 which through non-illustrated control rods, or the like, similar to the control sleeve 44 and the double control sleeve 49 is operatively connected to a common control lever of the post-control group 6. In an advantageous manner, the control rods of the main control group 5, and the control rod of the post-control group 6 should be so designed that by means of a common control lever, it is possible to control the velocity stages I to IV of the main control group as well as the control stakes K to Z of the post-control group. Instead thereof, also a control of the group transmission 4 in combination with the main control group 5 is applicable. The output shaft 42 of the post-control group 6 should preferably be coaxially arranged with regard to the countershaft 14 of the group transmission 4. Furthermore, the output shaft 42 between its bearing facing the gear 23 and the control sleeve 57 should be provided with a gear 58 non-rotatable thereon for driving a stroke depending auxiliary drive as, for instance, a front axle drive.

In addition thereto the change gear transmission according to the invention has a drive engine speed dependent driven auxiliary drive 59 which is provided with a gear 60 non-rotatably connected to the secondary shaft 25. Gear 60 preferably meshes with gear 12 of the transmission 3. Furthermore, the auxiliary drive 59 comprises a gear 61 non-rotatably connected to the secondary shaft 25. Gear 61 meshes with gear 62 and directly or indirectly meshes with a further gear 63 while the gears 62 and 63 serving for driving an auxiliary pump and a compressor respectively. Furthermore, the auxiliary drive 59 includes a gear 64 which is non-rotatably connected to the secondary shaft 25 and meshing with a gear 65. Gear 65 is non-rotatably connected to an intermediate shaft 66 which is coaxial with the output shaft 30. The intermediate shaft 66 has that end thereof which faces away from the output shaft 30, nonrotatably connected to the primary part 67 of a pressure medium operated friction clutch 68 designed as disc clutch. The secondary part 69 of the friction clutch 68 is non-rotatably connected to an auxiliary shaft 70. The auxiliary shaft 70 has non-rotatable thereon a gear 71 and non-rotatable thereon a gear 72 while gear 71 meshes with an associated gear 73 for the driving speed $n = 540$ of a pivot shaft drive. The gear 73 is freely rotatably and selectively engageable and disengageable on an auxiliary shaft 74. For the drive of the shaft 74 at a speed $n = 1000$ there is provided a gear 75 which is freely rotatable and selectively engageable and disengageable on said shaft 74. For preselecting the two possible output speeds of the shaft 74 which is adapted to be coupled with a non-illustrated pivot shaft stump there is provided a double control sleeve 76 which is located between the two gears 73 and 75 and is non-rotatable but axially arranged on the shaft 74.

It may be mentioned that instead of the disc clutches which are used in the group transmission 4 and are engageable by a pressure medium, also disc clutches may be employed which are engageable by spring force. This last mentioned arrangement may be provided in case a purely mechanical engagement of the clutches of the group transmission 4 is desired.

It is, of course, to be understood that the present invention is, by no means, limited to the specific showing in the drawing, but also comprises any modifications within the scope of the appended claims.

What is claimed is:

1. A geared transmission comprising: a first transmission group having a first input shaft and a first output shaft, a main second transmission group following the first transmission group and having a second input shaft and a second output shaft, a main output shaft driven by said second output shaft and connected to a load, said first transmission group having first clutch means engageable to provide a first forward drive stage between the said first input shaft and said first output shaft and a second drive stage between the said first input shaft and said first output shaft, providing an alternative drive between the said first input shaft and said first output shaft upon disengagement of said first clutch means, said second drive stage including a selectively engageable friction clutch having a common primary driving part which is continuously connected through the said input shaft of said first group with the output side of a prime mover, and secondary driven parts interposed between said primary part and said first output shaft, one of said secondary parts being connected to said first output shaft for forward drive and the other of said secondary parts being connected to said first output shaft for driving in the opposite direction for reverse drive, so that with said first clutch means disengaged, said primary driving part may selectively engage either of said secondary parts for either forward or reverse drive.

2. A geared transmission according to claim 1 in which the prime mover output side and said first output shaft and said clutch of said first means are coaxial while the prime mover output side is continuously frictionally connected to said first input shaft, a primary shaft supporting the primary part of the clutch of said second stage and first gears connecting the first input shaft to said primary shaft, second gears connecting one secondary part of the clutch to said first output shaft for forward rotation of said first output shaft, and third gears connecting the other secondary part of the clutch to said first output shaft for reverse rotation of said first output shaft.

3. A geared transmission in combination to claim 2 in which one of said third gears is fixed to said first output shaft and meshes with a further gear fixed to said second input shaft, said second input shaft adapted for driving connection to said second output shaft.

4. A geared transmission in combination according to claim 1 in which the said clutches of said second stage are disc clutches and the said clutch of said first clutch means is a friction clutch engageable by pressure.

5. A geared transmission in combination according to claim 1 which includes an auxiliary output shaft, a further friction clutch having a primary part connected to said auxiliary output shaft, a secondary shaft, gears connecting said secondary shaft to said first input shaft, and gears connecting said secondary shaft to said auxiliary output shaft.

6. A geared transmission in combination according to claim 5 in which said secondary shaft is parallel to said first output shaft.

7. A geared transmission in combination according to claim 5 in which said auxiliary output shaft is coaxial with said second output shaft.

8. A geared transmission in combination according to claim 5 in which said second stage includes a gear fixed to the other of said secondary part of the pertaining friction clutch and a gear fixed to said first output shaft and a gear meshing with both of the aforementioned gears and rotatable on said secondary shaft.

9. A geared transmission in combination according to claim 5 which includes auxiliary gears drivingly connected to said secondary shaft and adapted for driving pumps and the like.

10. A geared transmission in combination according to claim 3 in which said gears have equal numbers of teeth.

11. A geared transmission in combination according to claim 1 in which said second output shaft is coaxial with said first output shaft, clutch means operable for coupling said second output shaft directly to said first output shaft, said second input shaft being parallel with said second output shaft and driven by said first output shaft, and gears for selectively connecting said second input shaft to said second output shaft at a plurality of drive ratios.

12. A geared transmission in combination according to claim 11 which includes a pair of gears rotatable on said main output shaft, further gears fixed to said second output shaft and respective meshing with the gears of said pair, clutch means for selectively coupling the gears of said pair to said main output shaft, the gears of said pair being of respective sizes and one thereof providing for the highest speed said main output shaft.

13. A geared transmission in combination according to claim 12 which includes a smaller gear fixed to said second output shaft and meshing with the larger part of a compound gear rotatable on said main output shaft, a crawler shaft parallel to said main output shaft and having a first gear fixed thereto and meshing with the smaller part of said compound gear, a second gear fixed to the crawler shaft and a still further gear rotatable on said main output shaft meshing therewith, and clutch means selectively operable for clutching one of said compound gear and said still further gear to said main output shaft.

* * * * *

UNITED STATES PATENT OFFICE
CERTIFICATE OF CORRECTION

Patent No. 4023418  Dated May 17, 1977

Inventor(s) Walter Zenker

It is certified that error appears in the above-identified patent and that said Letters Patent are hereby corrected as shown below:

[73] Assignee: Klockner-Humboltd-Deutz should read:

[73] Assignee: Klöckner-Humboldt-Deutz

Signed and Sealed this

*twenty-third* Day of *August 1977*

[SEAL]

Attest:

RUTH C. MASON
*Attesting Officer*

C. MARSHALL DANN
*Commissioner of Patents and Trademarks*